US010401533B2

(12) United States Patent
Bonavides et al.

(10) Patent No.: US 10,401,533 B2
(45) Date of Patent: Sep. 3, 2019

(54) ELECTROMAGNETIC SENSING APPARATUS FOR BOREHOLE ACOUSTICS

(71) Applicant: HALLIBURTON ENERGY SERVICES, INC., Houston, TX (US)

(72) Inventors: Clovis Bonavides, Houston, TX (US); Burkay Donderici, Houston, TX (US); Oleg Bondarenko, Spring, TX (US); Boguslaw Wiecek, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 320 days.

(21) Appl. No.: 14/787,084

(22) PCT Filed: May 30, 2013

(86) PCT No.: PCT/US2013/043299
§ 371 (c)(1),
(2) Date: Oct. 26, 2015

(87) PCT Pub. No.: WO2014/193382
PCT Pub. Date: Dec. 4, 2014

(65) Prior Publication Data
US 2016/0077236 A1 Mar. 17, 2016

(51) Int. Cl.
E21B 12/02 (2006.01)
E21B 49/00 (2006.01)
(Continued)

(52) U.S. Cl.
CPC .............. G01V 11/007 (2013.01); G01V 1/46 (2013.01); G01V 3/28 (2013.01); G01V 11/00 (2013.01); G01V 3/087 (2013.01); G01V 3/38 (2013.01)

(58) Field of Classification Search
CPC ........ G01V 1/44; G01V 1/46; G01V 2210/47; G01V 1/40; G01V 1/48; G01V 1/306;
(Continued)

(56) References Cited

U.S. PATENT DOCUMENTS 5,852,262 A 12/1998 Gill et al.
5,936,913 A 8/1999 Gill et al.
7,460,435 B2 12/2008 Garcia-Osuna et al.
8,559,272 B2 * 10/2013 Wang ........................ G01V 1/46
340/854.3

(Continued)

FOREIGN PATENT DOCUMENTS

WO 2012/015421 A1 2/2012

OTHER PUBLICATIONS

International Search Report and Written Opinion issued in related PCT Application No. PCT/US2013/043299 dated Feb. 13, 2014, 14 pages.

Primary Examiner — Alesa Allgood
(74) Attorney, Agent, or Firm — Benjamin Fite; Baker Botts L.L.P.

(57) ABSTRACT

An example method for determining borehole acoustics using an electromagnetic sensing apparatus may include positioning a downhole tool within a borehole disposed in a formation. The downhole tool may comprise at least one acoustic source and at least one electromagnetic (EM) sensor. An acoustic wave may be emitted from the at least one acoustic source. The acoustic wave may generate an electrical signal when an EM field is present within the borehole. The electrical signal may be measured with the at least one EM sensor. At least one downhole characteristic may be determined based, at least in part, on the measured electrical signal.

11 Claims, 3 Drawing Sheets

(51) Int. Cl.
*G01V 3/12* (2006.01)
*G01V 1/40* (2006.01)
*G01V 11/00* (2006.01)
*G01V 1/46* (2006.01)
*G01V 3/28* (2006.01)
G01V 3/08 (2006.01)
G01V 3/38 (2006.01)

(58) Field of Classification Search
CPC .. G01V 1/00; G01V 1/284; G01V 2210/6222; G01V 1/303; B23B 2260/108; B23B 2260/128; B23B 35/00; E21B 47/12; E21B 47/101; E21B 47/00; E21B 47/14
See application file for complete search history.

(56) References Cited

U.S. PATENT DOCUMENTS

| | | | |
|---|---|---|---|
| 2003/0229450 A1 | 12/2003 | Strickland | |
| 2006/0214098 A1* | 9/2006 | Ramos | E21B 47/09 250/256 |
| 2007/0150200 A1 | 6/2007 | Charara et al. | |
| 2008/0125974 A1 | 5/2008 | Dubinsky et al. | |
| 2009/0261832 A1* | 10/2009 | DePavia | G01V 3/30 324/338 |
| 2013/0169279 A1* | 7/2013 | Morys | G01V 11/007 324/338 |
| 2014/0326506 A1* | 11/2014 | DiFoggio | G01H 15/00 175/39 |
| 2015/0123665 A1* | 5/2015 | Mukhopadhyay | G01V 1/48 324/338 |

\* cited by examiner

ELECTROMAGNETIC SENSING APPARATUS FOR BOREHOLE ACOUSTICS

CROSS-REFERENCE TO RELATED APPLICATION

The present application is a U.S. National Stage Application of International Application No. PCT/US2013/043299 filed May 30, 2013, which is incorporated herein by reference in its entirety for all purposes.

BACKGROUND

The present disclosure relates generally to well drilling operations and, more particularly, to an electromagnetic (EM) sensing apparatus for borehole acoustics.

During drilling and production operations, it may be necessary to identify certain downhole characteristics, including fluid, formation, cement, and pipe properties. Typically, some of these downhole characteristics are identified using acoustic waves and acoustic sensors, which identify vibrations and acoustic properties in the borehole. Unfortunately, the acoustic sensors are susceptible to background noise that may cause errors in measurements. Typical sources of noise include transducer ringdown noise and mechanical shock waves generated by tool movement or by other moving parts. These errors may be computationally difficult to account for and may increase the cost of various logging and measurement operations.

FIGURES

Some specific exemplary embodiments of the disclosure may be understood by referring, in part, to the following description and the accompanying drawings.

Figure 1:
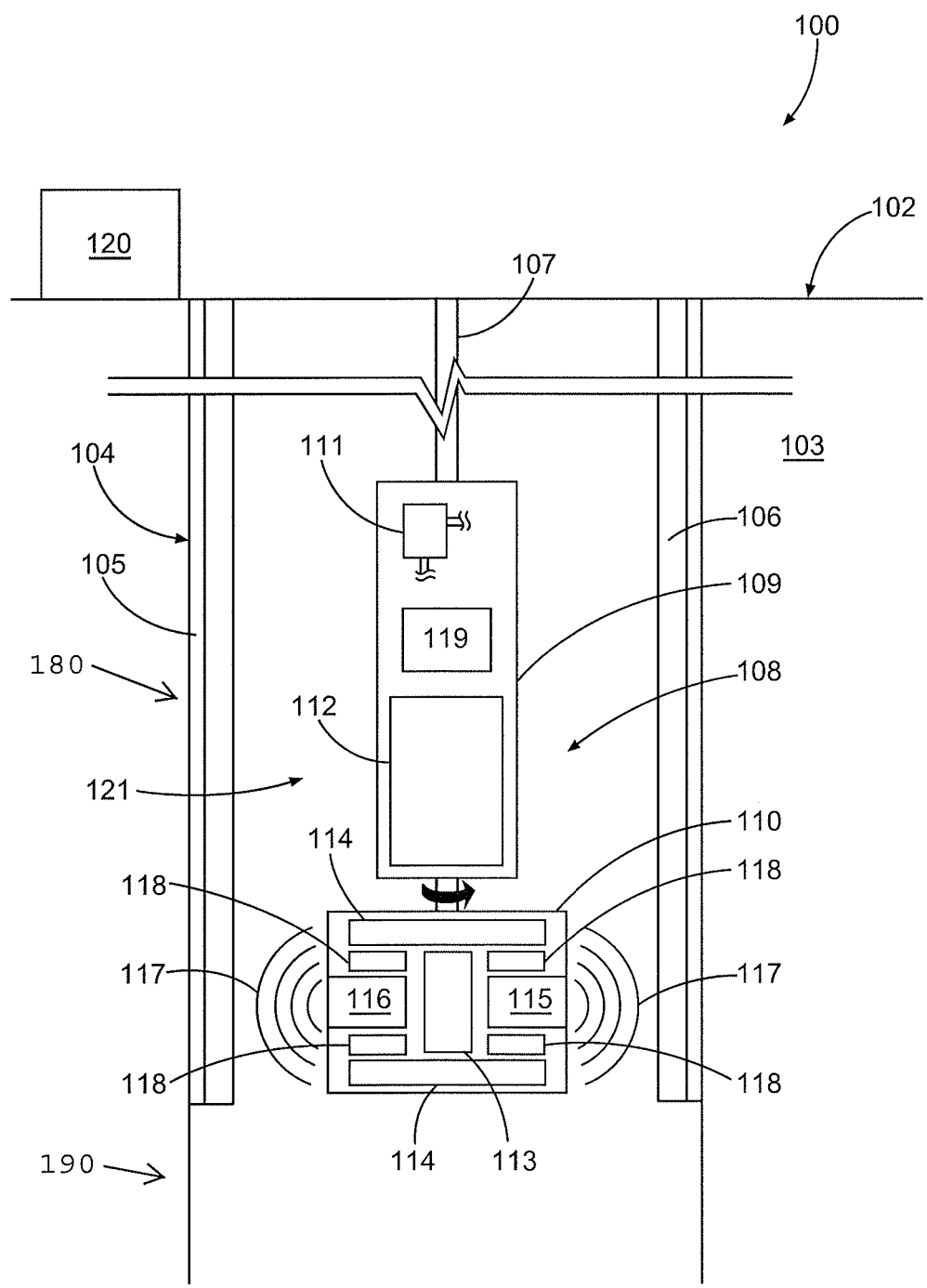
FIG. 1 illustrates an example logging system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to an electromagnetic EM sensing apparatus for borehole acoustics.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

According to aspects of the present disclosure, systems and methods for determining borehole acoustics using an electromagnetic sensing apparatus are disclosed herein. One example method may include positioning a downhole tool within a borehole disposed in a formation. The downhole tool may comprise at least one acoustic source and at least one EM sensor. An acoustic wave may be emitted from the at least one acoustic source. As will be described below, the acoustic wave may generate an electrical signal in an EM field within the borehole, which may be static or varying depending on the application. In certain embodiments, the EM field may comprise the Earth's magnetic field. In certain other embodiments, the downhole tool may generate the EM field using, for example, a magnet, a direct current source, or an antenna. The electrical signal may be measured with at least one EM sensor. At least one downhole characteristic—such as formation slowness, pipe slowness, pipe thickness, cement slowness, cement thickness, fluid slowness, and transmission media interfaces (e.g., interfaces between two media showing a contrast between acoustic impedances)—may be determined based, at least in part, on the measured electrical signal.

FIG. 1 shows an example logging system 100, according to aspects of the present disclosure. The logging system 100 may comprise a downhole tool 108 disposed in a borehole 104. The interior of the borehole 104 may be at least partially filled with a borehole fluid 121, which may be composed of drilling fluids, formation fluids, or a combination thereof. The downhole tool 108 may be suspended in the borehole 104 via a wireline 107, which may provide power from a power source (not shown) on the surface 102 and which may also provide communication to and from a control unit 120 positioned on the surface 102. Although a wireline 107 is shown, the downhole tool 108 may also be conveyed into the borehole 104 and communicate with the control unit 120 via coiled tubing or slickline. Additionally, the downhole tool 108 may be coupled to a pipe and conveyed into the borehole 104. For example, the downhole tool 108 may be incorporated into a bottom hole assembly (BHA) of a conventional drilling assembly, positioned between a drill bit and a drill string of the drilling assembly. The downhole tool 108 may function as a measurement-while-drilling (MWD) or logging-while-drilling (LWD) tool, taking measurements or logs of the borehole 104 while the drilling assembly is disposed in the borehole 104. Any measurements or logs taken at the downhole tool 108 may be communicated to a control unit 120 through a telemetry system (e.g., wired pipe, fiber optics, mud pulse, etc.) that would be appreciated by one of ordinary skill in the art in view of this disclosure.

The control unit 120 may comprise a processor and a memory device coupled to the processor. The memory device may contain instructions that when executed may cause the control unit 120 to issue control signals to the downhole tool 108 and to receive measurements from the downhole tool 108. In certain embodiments, the control unit 120 may communicate with a control module 111 disposed in the downhole tool 108. The control module 111 may also comprise a processor and memory containing instructions and may cooperate with the control unit 120 to control the downhole tool 108 and communicate measurements to the control unit 120. In certain embodiments, the control module 111 may generate commands to components in the downhole tool 108 without prompting from an exterior source, such as the control unit 120. Measurements received at the downhole tool 108, as will be described below, may also be stored in memory within the control module 111 until the downhole tool 108 is retrieved to the surface 102. The control unit 120 may process the measurements alone or in combination with the control module 111, or at another data processing device, to determine certain downhole characteristics, as will be described below.

The downhole tool 108 may be positioned in the borehole 104 disposed in a formation 103. The formation 103, for example, may comprise layered subsurface rock strata. The borehole 104 may comprise a portion 180 that is "cased" and a portion 190 that is "open". The "cased" portion 180 may comprise a tubular metal casing or pipe 106, such as a production pipe, that is secured within the borehole 104. In the embodiment shown, the pipe 106 is secured within the borehole 104 via cement layer 105. The "open" portion 190 may comprise a portion of the borehole 104 that is not cased. Although FIG. 1 illustrates a borehole 104 with both a cased portion 180 and an open portion 190, the entire borehole 104 may either be cased or open in other embodiments In the embodiment shown, the downhole tool 108 comprises at least one acoustic source 115 and 116. The acoustic sources 115 and 116 may emit acoustic waves 117. The acoustic waves 117 may comprise pressure waves that directly and/or indirectly generate secondary compressional waves within the borehole fluid 121. In particular, the pressure fluctuations caused by the acoustic waves 117 may excite transmission media surrounding the downhole tool 108. The transmission media may comprise physical elements that transmit pressure waves. Exciting the transmission media may comprise causing some or all of the transmission media to vibrate. In the cased portion 180 of the borehole 104, the transmission media may include the borehole fluids 121, the pipe 106, the cement layer 105, and the formation 103. Exciting the transmission media may comprise causing the pipe 106 to vibrate. In the open portion 190 of the borehole 104, the transmission media may include the borehole fluid 121 and the formation 103. In addition to exciting the transmission media, the acoustic waves 117 may be reflected and refracted by interfaces between adjacent transmission media with different acoustic impedances. The refracted and reflected acoustic waves 117 as well as acoustic waves generated by the vibration of the excited transmission media may propagate within the borehole fluid 121 as secondary compressional waves.

In certain embodiments, an EM field may be present in the borehole 104. This could be a static magnetic field, such as the magnetic field of the Earth, or a dynamic EM field, such as one varying sinusoidally at a frequency much lower than the frequencies of the acoustic waves 117. The compressional waves may change the concentration of the particles and molecules that make up the borehole fluid 121. This may create zones within the borehole fluid 121 of higher and lower particle/molecular concentration or density. The particle concentration or density variations may create disturbances in the EM field within the borehole fluid 121, because the EM field distribution in any small volume of fluid will change in time as it goes between compressed and decompressed states. The disturbances within the EM field in the borehole fluid 121 may, therefore, generate an electric signal that is an electrical representation of the secondary compressional waves.

The downhole tool 108 may further comprise at least one EM sensor 113, 114, and 118 that may measure the electrical signal. In certain embodiments, the sensors 113, 114, and 118 may comprise antennae or arrays of antennae, which may focus EM energy for improved directionality. Notably, an acoustic sensor is typically used to measure the compressional wave directly, instead of measuring an electrical signal corresponding to the compressional wave. Conventional acoustic sensors, however, are sensitive to ambient noise, tool movement, and other mechanical noise sources. By measuring the compressional wave with an EM sensor, the noise problems of the acoustic sensor configuration can be reduced, providing a system with a superior signal-to-noise ratio.

As will be appreciated by one of ordinary skill in view of this disclosure, the electrical signal corresponding to the secondary compressional waves may be small in amplitude, such as in the microvolts or nanovolts range. Current analog electronics technologies allow for amplification of electrical signals in the nanovolts range, which may be useful in certain embodiments of the present disclosure. Additionally, theoretical and technological advancements in Digital Signal Processing allow for improved signal recovery through more detailed and faster signal digitization and elimination of unwanted signals through digital filtering and/or cancelation of background noise. One example technique includes periodically recording background noise in the borehole after the signals from the acoustic source(s) have died out.

The measured electrical signal may be communicated, for example, to control module 111 or control unit 120, where at least one downhole characteristic may be determined based, at least in part, on the measured electrical signal. The measured electrical signal, like the compressional wave, may have a portion that corresponds to the reflected/refracted acoustic waves 117 and a portion that corresponds to the vibration of certain transmission media. The reflected/refracted wave portion and the vibration portion may carry information regarding certain downhole characteristics, which may be calculated directly or may be extrapolated from them. These downhole characteristics may include at least one of formation slowness, pipe slowness, pipe thickness, cement slowness, cement thickness, fluid slowness, and the transmission media interfaces. In certain embodiments, the measured electrical signal may be stored within the downhole tool 108 until the downhole tool 108 is retrieved at the surface 102.

The reflected/refracted wave portion, for example, may carry information (e.g., reflectivity and geometry) about the surface of the wall of the borehole 104, and about certain fluid properties of the borehole fluids 121, like signal attenuation and acoustic travel time. The vibration portion, on the other hand, may carry information about downhole characteristics that affect the vibration of the transmission media. For example, these downhole characteristics may include the composition (constituent materials), internal and internal/external surface geometries, thickness, acoustic impedance, surface condition, mechanical integrity, etc., of the pipe 106. Other downhole characteristics that may influence the vibration of the pipe 106 include the acoustic impedance of borehole fluid 121 and of the medium behind the pipe 106 (natural rocks; cement 105; fluids; artificial artifacts such as pipe centralizers, installed sensors, conductor cables, etc.; or a combination thereof), the geometry of the interfaces between the different transmission media (interfaces between borehole 104, pipe 106, cement 105 and formation 103), the acoustic energy attenuation in the borehole fluid 121, etc. These downhole characteristics may be determined through numerical and mathematical analysis of the measured electrical signal that would be appreciated by one of ordinary skill in the art in view of this disclosure.

The vibration portion may be characterized by vibration amplitude as a function of time in a certain time range of measurement. It may also be characterized by a vibration start time, a vibration end time, a vibration phase and a vibration envelope as a function of time. In certain embodiments, the downhole characteristics may comprise a pipe vibration parameter, which may be determined based, at least in part, on the measured electrical signal through an inversion or look up table Additionally, a slowness factor of the borehole fluid 121 may be determined based on the fluid signal portion of the measured electrical signal.

In certain embodiments, the downhole tool 108 may comprise a non-rotating portion 109 and a rotating portion 110. A motor 119 for rotating the rotating portion 110 may be disposed within the non-rotating portion 109, and may comprise an electric motor that receives power from the surface 102 and/or via a power source (not shown) disposed in the downhole tool 108. The at least one acoustic source 115 and 116 and the at least one EM sensor 113, 114, and 118 may be disposed on the rotating portion 110. Notably, the acoustic sources 115 and 116 and the EM sensors 113, 114, and 118 may be rotated around the borehole 104, taking sequential azimuthal measurements to provide a higher resolution, pinpointed description of features around the wall of the borehole 104. These measurements may be logged at the control unit 120, for example, and/or in memory disposed in the downhole tool 108, and the combined measurement set may be used to determine the downhole characteristics.

In certain embodiments, EM sensors 118 may comprise directionally focused antenna, and EM sensors 113 may comprise an array of antennae. These EM sensors may be used to sense the electrical signals in multiple areas and from multiple angles to increase the data used in determining the downhole characteristic. In the open portion 190 of the borehole 104, mounting an array of antenna on the rotation portion 110 may help better profile how the acoustic energy is being reflected (scattered away) at the wall of the borehole 104, and aid in the mapping of the wall geometry of the borehole 104. It may also aid in certain situations to detect anisotropic characteristics in earth formations traversed by the borehole 104 by identifying properties that may change along different geometrical orientations.

In certain embodiments, the downhole tool 108 may not have an acoustic source, or may make measurements without generating acoustic waves 117 in the borehole 104. For example, vibrations in pipe 106 might originate from a flow of fluids—e.g., oil or water—within areas located behind the pipe 106, such channels or fractures in the cement 105 or formation 103, a micro-annulus at the pipe/cement interface, or any other fluid migration channel or pathway. In certain instances where the flow of fluid outside of the pipe 106 is unwanted or unintentional, these fluid flows may be referred to as "leaks." The downhole tool 108 may be used to detect certain leaks, for example, by turning off the acoustic source 115/116 or otherwise not emitting acoustic waves 117 and placing the downhole tool 108 in a static position, such that all or most of the vibration in pipe 106 is caused by a leak. The EM sensor 113, 114, and 118 may then be used to identify 1) if there is a leak (i.e., if pipe 106 is vibrating) and 2) the vibration characteristics of the pipe 106, which may provide information regarding the type and location of the leak.

The downhole tool 108 also may be used to determine fluid flow within the pipe 106 using similar configurations to those used to determine if a leak exists. For example, the downhole tool 108 may have its acoustic source 115/116 disengaged or otherwise turned off when it is being used to detect a flow of fluid proximate to a pipe 106. The EM sensor 113, 114, and 118 may then receive an electrical signal generated by the vibrations of the pipe 106 affecting the EM field within the borehole 104. The electrical signal may then be used to determine the vibration characteristics of the pipe 106 and other downhole characteristics related to the vibration characteristics of the pipe 106 as described above.

In certain embodiments, an EM field may be generated in the borehole 104, instead of using the magnetic field of the Earth. In the embodiment shown, the downhole tool 108 comprises an EM source 112, which may but is not required to be disposed on a non-rotating portion 109 of the downhole tool 108. The EM source 112 may comprise at least one of a magnet, a direct current source, a solenoid winding, or an antenna. Other EM sources that generate an EM field may also be used, as would be appreciated by one of ordinary skill in view of this disclosure. In certain embodiments, the EM source 112 may receive a signal from the control unit 120 or control module 111 that causes the EM source 112 to generate the EM field.

In certain embodiments, an EM field may be measured at the EM sensors 113, 114, and 118 as a steady state electrical signal. This steady state signal may affect the measurement of the electrical signal generated by the acoustic wave 117. In certain embodiments, determining the formation characteristics based, at least in part, on the measured electrical signals generated by the acoustic waves may include subtracting the steady state electrical signal from the measured electrical signal to adjust for the electrical signal portion caused by the EM field. Additionally, unwanted measurement portions within the measured electrical signals may also be removed or reduced by applying filters in the time, frequency, or slowness domains, based on certain characteristics of the measured electrical signal and on the nature of the unwanted effects. These error correction schemes may be completed at least partially in the control unit 120 positioned at the surface 102.

In certain embodiments, unwanted noise may be eliminated based on the characteristics of the electrical signals received at the EM sensors 113, 114, and 118. As is described above, the EM field may be modulated by periodic vibrations of the pipe 106 caused by the acoustic wave 117. A periodic modulation of the EM field may generate an alternating current (AC) electrical signal that is sensed and recorded by the EM sensors 113, 114, and 118. In addition to the AC electrical signal, the EM sensors 113, 114, and 118 may also receive a direct current (DC) electrical signal generated by the EM source 112 and transmitted through borehole fluid 121 and the body of the downhole tool 108. Since the electrical signal of interest is the AC electrical signal generated by the pipe 106, the DC portion of the received electrical signal may be filtered out by frequency dependent filtering for the determination of downhole characteristics. Background signals that are constant or predictable may also be subtracted from the received signals.

Figure 2:
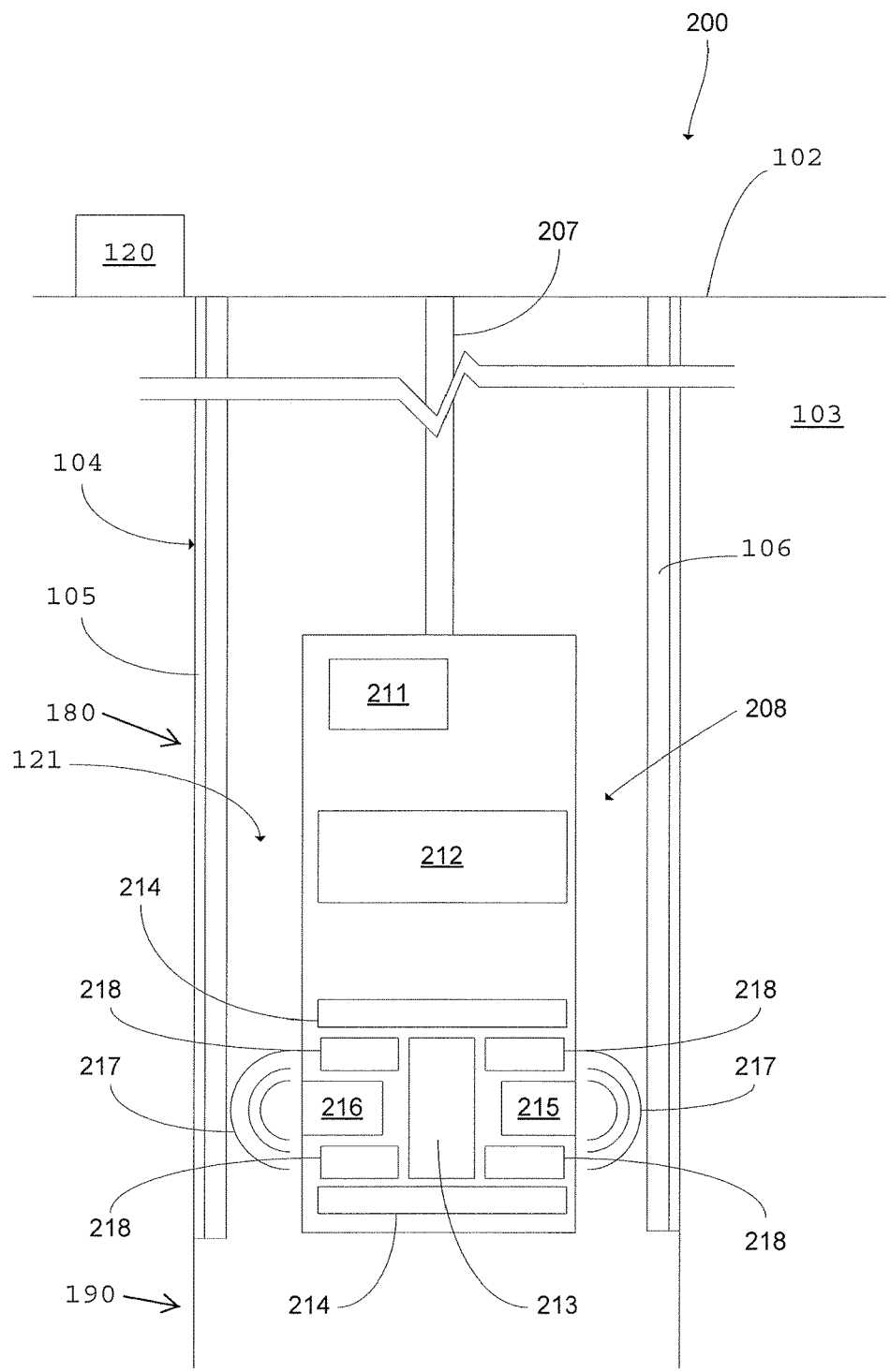
FIG. 2 illustrates another example logging system, according to aspects of the present disclosure.

FIG. 2 shows another example logging system 200, according to aspects of the present disclosure. The logging system 200 may comprise a downhole tool 208 disposed in the same borehole 104 from FIG. 1. Like the downhole tool 108, the downhole tool 208 may comprise a control module 211, and may be suspended in the borehole by a wireline 207. Additionally, the acoustic sources 215 and 216 may emit acoustic waves 217 similar to acoustic waves 117 in FIG. 1, and EM sensors 213, 214, and 218 may measure electrical signals generated directly and/or indirectly by the acoustics waves 217. The downhole tool 208 may further have an EM source 212 to generate the EM field within the borehole 104.

Unlike the downhole tool 108, however, the tool 208 may comprise a single non-rotating body, instead of rotating and non-rotating sections. The acoustic sources 215 and 216 and the EM sensors 213, 214, and 218 may all be disposed on the non-rotating tool 208. In certain embodiments, the number of EM sensors and acoustic sources may be increased around the radius of the tool 208 compared to the tool 108. This may increase the azimuthal resolution of the tool 208 without the added complexity of having a rotating portion and a non-rotating portion.

Figure 3:
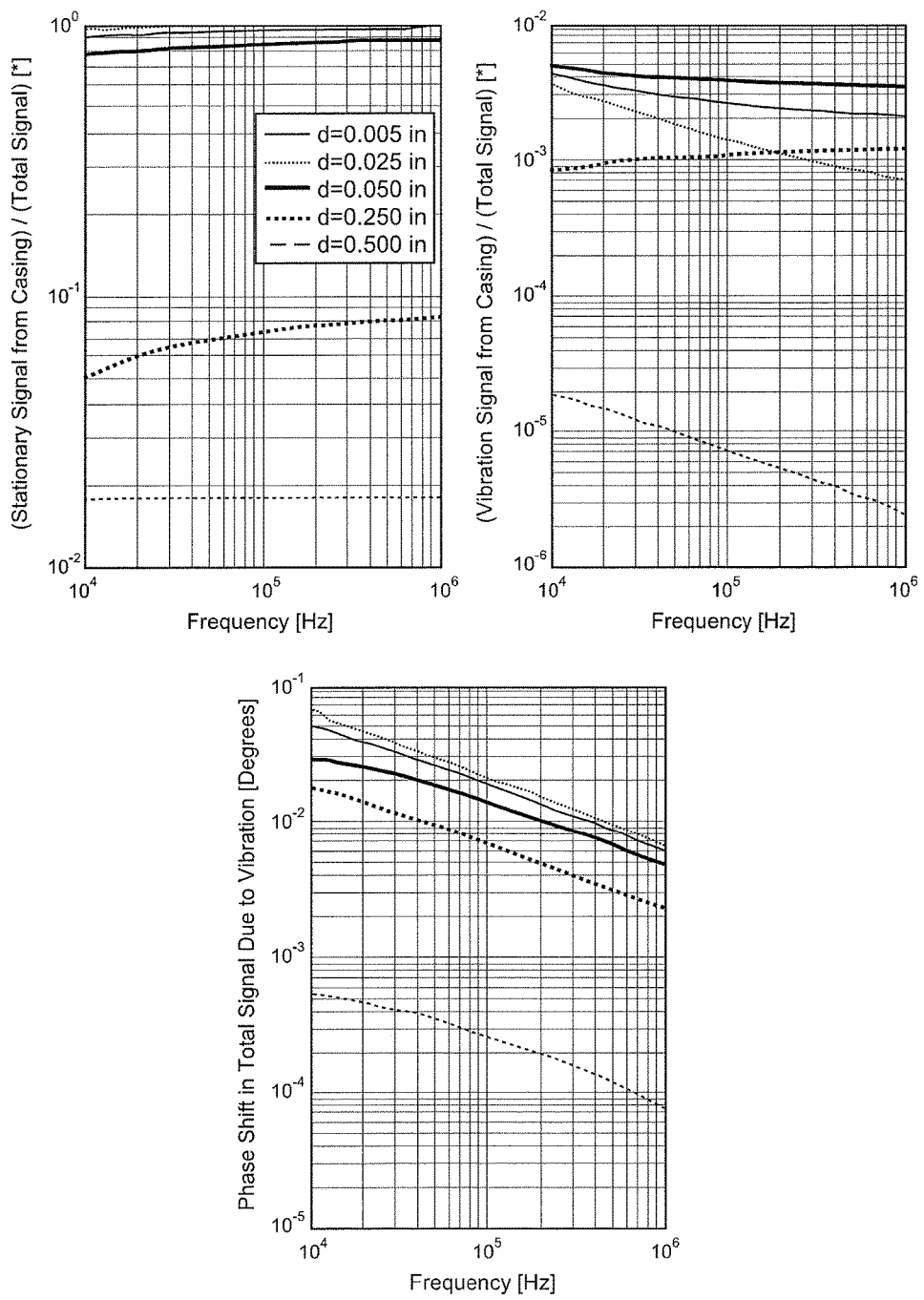
FIG. 3 illustrates an example response from a logging system according to aspects of the present disclosure.

In certain embodiments, the distances from the EM sensors and EM sources to the borehole wall may affect the accuracy to the tool and its ability to accurately measure electrical signals generated by the acoustic waves. FIG. 3 illustrates an example response in a downhole tool comprising an electrically small antenna as an EM source and an electrically small antenna as an EM sensor, with a spacing of 0.5 inches in between and a variable distance d between the EM sources and sensors and the borehole wall. In the response, the vibration amplitude of a pipe assumed to be 10 μm and a water-based mud (WBM) is assumed to be the borehole fluid.

Graph a of FIG. 3 plots the stationary signal strength as a percentage of the total electrical signal strength versus the frequency of the total EM field signal. As can be seen, when the distance is greater between the EM sources and sensors and the borehole wall, the stationary signal strength represents a smaller percentage of the total electrical signal, with the frequency of the total electrical signal having a limited impact. Graph b of FIG. 3 plots the vibration signal strength as a percentage of the total electrical signal versus the frequency of the total EM field signal. Unlike with the stationary signal, the distance of the EM sources and sensors from the borehole wall does not have a linear effect on the vibration signal strength relative to the total electrical signal. Graph c, in contrast, plots the phase shift in the total electrical signal due to vibration versus the frequency of total EM field signal, and illustrates that the phase shift is more pronounced at lower frequencies.

As will be appreciated by one of ordinary skill in view of this disclosure, the present disclosure utilizes the ease of handling EM signals, including simpler sampling conditions, as well as more rugged implementations possible in EM system, to improve the accuracy and robustness of measured acoustic properties, something that can be very complicated with conventional acoustic sensors. Additionally, embodiments of the disclosure discussed herein may provide a higher immunity to noise than most other sensors that are normally used in borehole acoustics. Therefore, the present disclosure is well adapted to attain the ends and advantages mentioned as well as those that are inherent therein.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for determining borehole acoustics, comprising: positioning a downhole tool within a borehole, wherein the downhole tool comprises an acoustic source, an electromagnetic (EM) source and at least one EM sensor, wherein the EM source and the at least one EM sensor are positioned a distance of at or about 0.5 inches or less to a wall of the borehole; emitting, from the acoustic source, an acoustic wave in a borehole disposed within a formation, wherein the acoustic wave generates a first electrical signal in an electromagnetic (EM) field generated by the EM source within the borehole, and wherein the first electrical signal is at or above 10 kilohertz; determining at least one downhole characteristic based, at least in part, on the measured first electrical signal; measuring a second electrical signal, wherein the second electrical signal is not generated by the acoustic wave; and determining the presence of a leak using the measured first electrical signal and the measured second electrical signal, wherein the leak is associated with a fluid flow, wherein the leak is flow of fluid outside of a pipe, and wherein the downhole tool is disposed in the pipe in a static position.

2. The method of claim 1, wherein the EM field within the borehole comprises the Earth's magnetic field.

3. The method of claim 1, wherein the EM source comprises at least one of a magnet, a direct or oscillating (DC or AC) current source, a solenoid winding, and an antenna.

4. The method of claim 1, wherein the at least one EM sensor comprises an array of antennae.

5. A method for determining borehole acoustics, comprising: positioning a downhole tool within a borehole disposed in a formation, wherein the downhole tool comprises at least one acoustic source, an electromagnetic (EM) source and at least on electromagnetic (EM) sensor, wherein the EM source and the at least one EM sensor are positioned a distance of at or about 0.5 inches or less to a wall of the borehole; emitting an acoustic wave from the at least one acoustic source, wherein the acoustic wave generates an electrical signal in an EM field generated by the EM source within the borehole, and wherein the first electrical signal is at or above 10 kilohertz; determining at least one downhole characteristic based, at least in part, on the measured first electrical signal; measuring a second electrical signal, wherein the second electrical signal is not generated by the acoustic wave; and determining the presence of a leak using the measured first electrical signal and the measured second electrical signal, wherein the leak is associated with a fluid flow, wherein the leak is flow of fluid outside of a pipe, and wherein the downhole tool is disposed in the pipe in a static position.

6. The method of claim 5, wherein the EM field within the borehole comprises the Earth's magnetic field.

7. The method of claim 5, wherein:
the EM source comprises at least one of a magnet, a direct or oscillating (DC or AC) current source, a solenoid winding, and an antenna.

8. The method of claim 5, wherein the at least one EM sensor comprises an array of antennae.

9. The method of claim 5, wherein the at least one downhole characteristics comprises a formation slowness.

10. A system for pipe inspection in a subterranean formation, comprising: a downhole tool, wherein the downhole tool comprises at least one acoustic source, an electromagnetic (EM) source and one EM sensor, wherein the EM source and the at least one EM sensor are positioned a distance of at or about 0.5 inches or less to a wall of the borehole; at least one processor in communication with the at least one acoustic source and the at least one EM sensor, wherein the processor is coupled to at least one memory element containing a set of instruction that when executed by the processor cause the processor to: signal the at least on acoustic source to emit an acoustic wave into an EM field generated by the EM source within the borehole, and wherein the first electrical signal is at or above 10 kilohertz; signal the at least one EM sensor to measure a first electrical signal generated by the acoustic wave in the EM field;
determine at least one downhole characteristic based, at least in part, on the measured electrical signal; signal the at least one EM sensor to measure a second electrical signal not generated by the acoustic wave in the EM field; and
determine the presence of a leak associated with a fluid flow using the measured first electrical signal and the measured second electrical signal, wherein the leak is flow of fluid outside of a pipe, and wherein the downhole tool is disposed in the pipe in a static position.

11. The system of claim 10, wherein the at least one EM source comprises at least one of a magnet, a direct or oscillating (DC or AC) current source, a solenoid winding, and an antenna.

* * * * *